United States Patent [19]

Gottschalk

[11] 4,420,231
[45] Dec. 13, 1983

[54] MOTION PICTURE CAMERA
[75] Inventor: Robert E. Gottschalk, Los Angeles, Calif.
[73] Assignee: Panavision, Incorporated, Tarzana, Calif.
[21] Appl. No.: 378,854
[22] Filed: May 17, 1982
[51] Int. Cl.³ .............................................. G03B 3/00
[52] U.S. Cl. .................................... 352/142; 354/150; 354/223
[58] Field of Search ................... 352/141, 142, 94, 95, 352/133, 243; 354/223, 150

[56] References Cited
U.S. PATENT DOCUMENTS

| | | | |
|---|---|---|---|
| 2,653,528 | 9/1953 | Mueller | 352/142 |
| 3,124,033 | 3/1964 | Freudenschuss | 352/141 |
| 3,127,809 | 4/1964 | Denk | 352/142 |
| 3,198,102 | 8/1965 | Mitchell | 352/141 |
| 3,913,116 | 10/1975 | Kastner et al. | 354/223 |

FOREIGN PATENT DOCUMENTS 50-88618  7/1975  Japan .................... 354/150

*Primary Examiner*—Monroe H. Hayes
*Attorney, Agent, or Firm*—John B. Young

[57] ABSTRACT

Motion picture camera apparatus uses a 35 mm prime lens assembly for a 16 mm motion picture camera. Between the prime lens assembly and the motion picture camera there is positioned a pair of fixed parallel mirrors mounted at an angle to the axis of the prime lens assembly. The light from the prime lens assembly may be reflected by a full mirror into a viewfinder, or through a partial mirror to both the viewfinder and the motion picture camera. A relay lens is positioned in the light path from the prime lens assembly to the motion picture camera.

7 Claims, 5 Drawing Figures

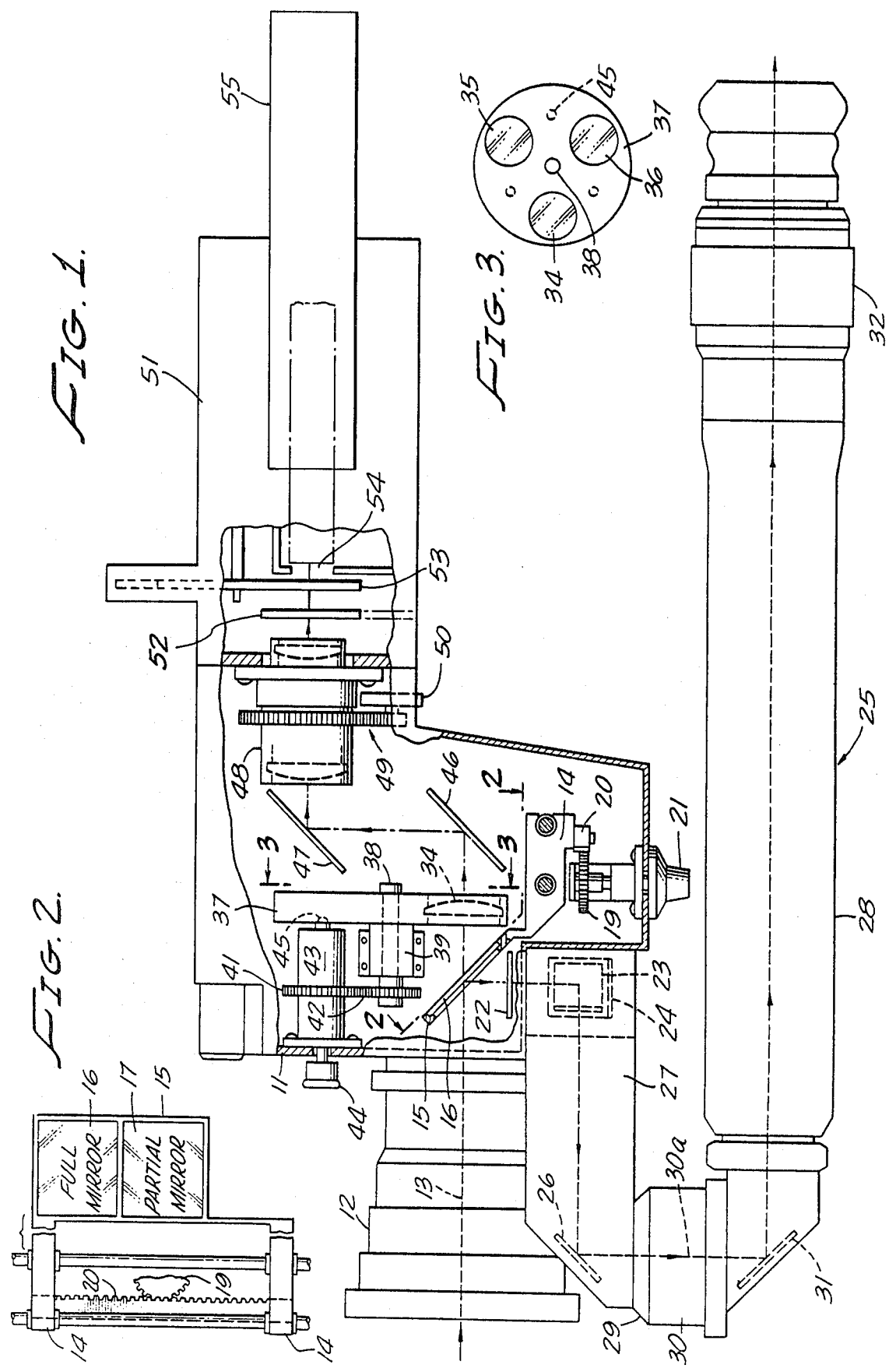

MOTION PICTURE CAMERA

This invention relates to cinematography and is particularly directed to a motion picture camera device using large diameter lenses, for example, lenses for a 35 mm camera, together with a small size camera, for example, a 16 mm camera. The overall length of the assembly is shortened through the use of a pair of spaced mirrors mounted at angles with respect to the axis of the 35 mm prime lens. A viewfinder receives light from the prime lens assembly either through a full mirror or a partial mirror. The quality of the image at the viewfinder and at the camera film plane are both enhanced by the use of the 35 mm lenses. The camera assemby of this invention is particularly adapted for studio use, and for operation by cameramen skilled in operation of motion picture cameras using light-sensitive film advanced frame by frame through the camera.

Further and more detailed objects and advantages will appear hereinafter.

In the drawings:

FIG. 1 is a plan view partly broken away, showing a preferred embodiment of this invention.

FIG. 2 is a sectional detail taken substantially on the lines 2—2 as shown on FIG. 1.

FIG. 3 is a view taken substantially on the lines 3—3 as shown on FIG. 1.

Figure 4:
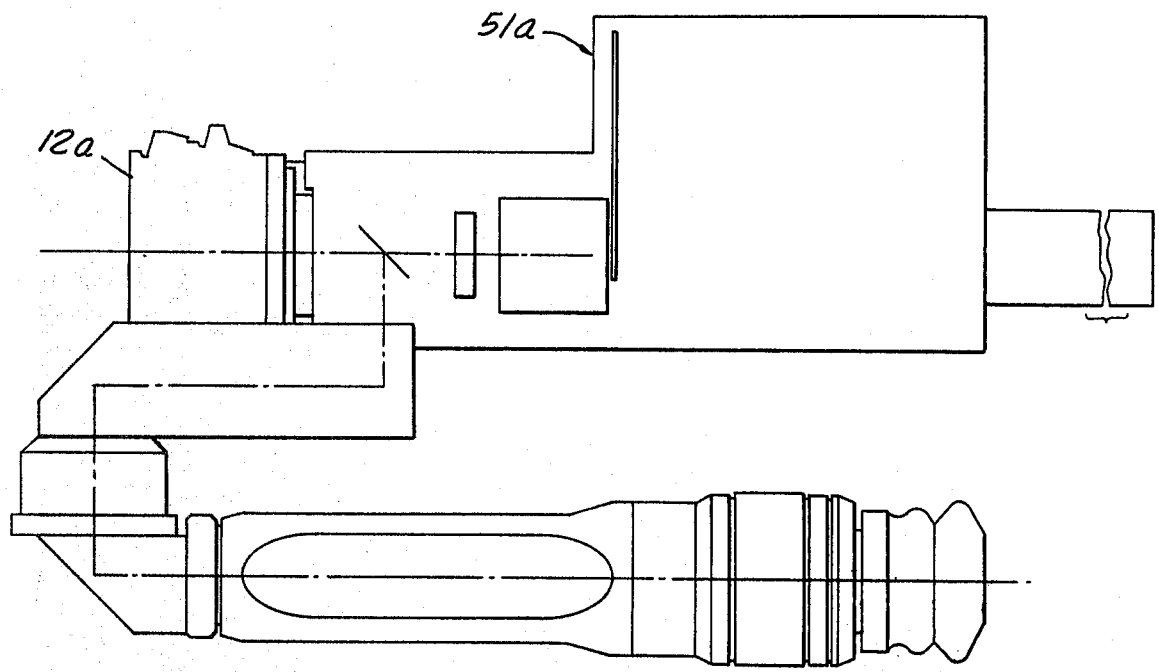
FIG. 4 is a top plan view showing a modification.

Referring to the drawings, the camera assembly generally designated 10 includes a housing 11 and a detachable prime lens assembly 12 having an optical axis 13. A vertically movable carrier 14 supports a frame 15 which carries a full mirror 16 and a partial mirror 17, either of which may be brought into alignment with the optical axis 13 by movement of the carrier 14. The full mirror 16 and partial mirror 17 are carried at an angle of 45° with respect to the optical axis 13. Vertical movement of the carrier 14 is accomplished by means of gear 19 meshing with gear rack 20. A manually accessible knob 21 is mounted outside the housing 11 and serves to turn the gear 19, or the gear may be turned by an electric motor, if desired.

When the full mirror 16 is positioned in alignment with the optical axis 13, light from the lens assembly 12 is reflected through the ground glass 22 and into vertically spaced mirrors in the viewfinder eyepiece assembly generally designated 25. The mirrors 23 and 24 as well as the mirror 26 are mounted in the fixed portion 27 of the viewfinder eyepiece assembly 25. This portion 27 is fixed with respect to the camera housing 11. A movable portion 28 of the viewfinder eyepiece assembly 25 is connected by a rotary joint 29 to the fixed portion 27. A Pechan prism 30 is mounted within the movable joint 29. A mirror 31 is mounted in the movable portion 28 remote from the eyepiece lens 32.

From this description it will be understood that light from the lens assembly 12 is reflected by full mirror 16 to the ground glass 22 and then by mirrors 23, 24, 26, Pechan prism 30, and mirror 31 to the eyepiece lens 32. It will also be understood that the movable portion 28 of the viewfinder eyepiece assembly 25 may be swung about the transverse horizontal axis 30a.

When the partial mirror or pellicle 17 is aligned with the optical axis 13, only a part of the light passes into the viewfinder eyepiece assembly 25, and the remainder of the light passes through one of lenses 34, 35 or 36 carried on the rotary turret 37. Each of the turret lenses 34 is intended for use with a particular prime lens assembly 12, or range of such lens assemblies. The turret 37 is mounted on a rotary shaft 38 supported in a bearing 39 fixed within the housing 11. The shaft 38 is driven by gears 41 and 42 from a driver 43 turned by a knob 44 accessible exteriorly of the housing 11. The knob 44 also controls a projection 45 received in one of a plurality of indentations in the turret 37, to hold the turret in selected position. If desired, an electric motor may be provided for the driver 43.

Light passing through a turret lens 34 or 35 or 36 is reflected by the fixed mirror 46 mounted at an angle to the optical axis 13, for example 45°. The light is then reflected from the fixed mirror 47 into a relay lens assembly 48. The fixed mirrors are preferably parallel. A gear drive assembly 49 controls an iris opening for light passing through the relay lens assembly 48 and into the motion picture camera 51. A manual operator 50 accessible exteriorly of the housing 11 is employed to turn the gear drive assembly 49, although an electric motor may be provided, if desired. The motion picture camera 51 is of conventional construction, employing a filter 52, a rotary shutter 53, film plane 54, film magazine 55, etc.

It will be noted that the 16 mm moving picture camera 51 and the viewfinder eyepiece assembly 25 both use the same 35 mm lens assembly 12, so that the camera 51 and the viewfinder eyepiece assembly 25 both "see" the same scene.

Figure 5:
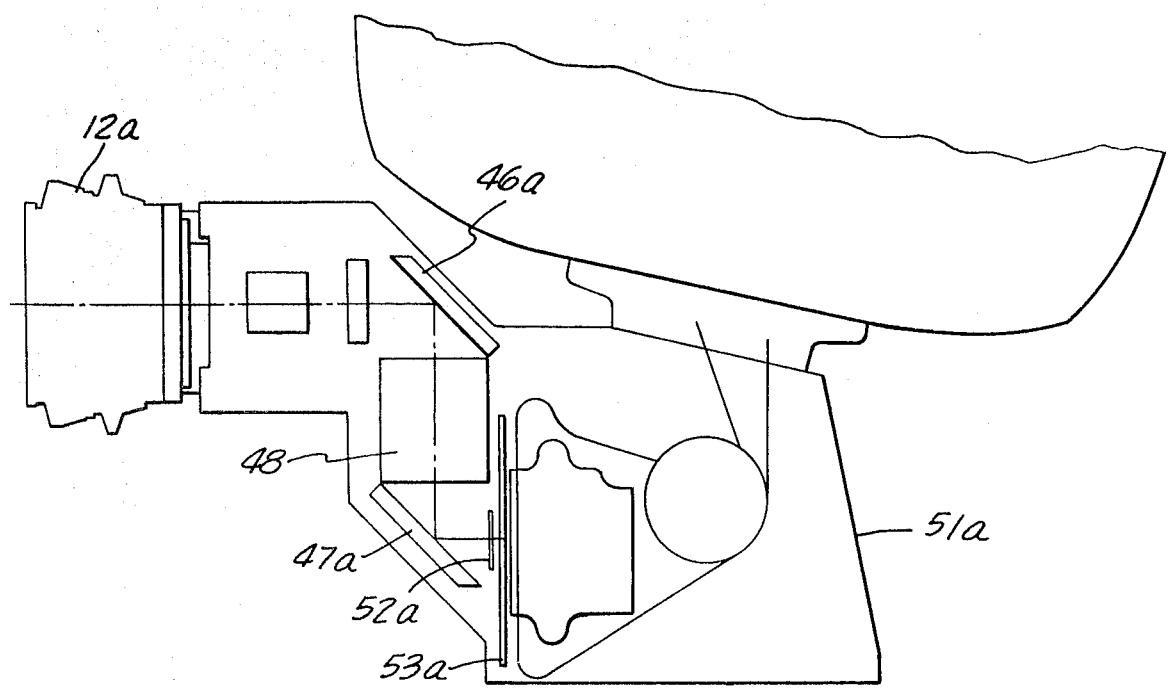
FIG. 5 is a side elevation showing the device of FIG. 4.

In the modification shown in FIGS. 4 and 5, the 16 mm motion picture camera 51a is positioned at a location below the level of the prime lens 12a, and the fixed mirror 47a is below the fixed mirror 46a. The relay lens assembly 48 is placed between the mirrors 46a and 47a. Light from the mirror 47a passes through the removable filter 52a and into the camera 51a by way of the rotary shutter 53a. Light for the viewfinder 25a is obtained in the same manner shown in FIG. 1, using either the full mirror or the partial mirror.

Having fully described my invention, it is to be understood that I am not to be limited to the details herein set forth but that my invention is of the full scope of the appended claims.

I claim:

1. A motion picture camera device comprising, in combination: a housing, a prime 35 mm lens assembly mounted on said housing, a viewfinder eyepiece assembly pivotally mounted on said housing to turn about a horizontal axis, a 16 mm motion picture camera, means for transmitting light from the prime lens assembly to either the motion picture camera or to the viewfinder eyepiece assembly, or both, the light path to the motion picture camera including spaced fixed mirrors, the first being positioned at an angle to the axis of the prime lens assembly, to receive light therefrom, the second reflecting light from the first, and a relay lens in said light path.

2. Motion picture camera apparatus comprising, in combination: a housing, a prime lens assembly supported on said housing and having an optical axis, a movable carrier having a mirror and a partial mirror mounted thereon and positioned in substantially the same plane at an angle to said optical axis, means for moving said carrier in a direction at right angles to said optical axis to bring either of said mirrors into alignment with said optical axis, a viewfinder eyepiece assembly pivotally mounted on said housing to turn about a horizontal axis, said assembly having elements positioned to receive light from either said mirror or said partial mirror, a fixed mirror in said housing positioned at an angle to said optical axis, a motion picture camera, and a relay lens optically interposed between said fixed mirror and said motion picture camera.

3. Motion picture camera apparatus comprising, in combination: a housing, a prime lens assembly mounted on said housing and having an optical axis, a movable device having a mirror and a partial mirror mounted thereon and positioned in substantially the same plane at an angle to said optical axis, means for moving said device in a direction at right angles to said optical axis to bring either of said mirrors into alignment with said optical axis, a viewfinder eyepiece assembly pivotally mounted on said housing to turn about a horizontal axis, said assembly having elements positioned to receive light from either said mirror or said partial mirror, parallel mirrors fixed in said housing, one mirror being positioned at an angle to said optical axis, a motion picture camera, and a relay lens optically interposed between the other fixed mirror and said motion picture camera.

4. Motion picture camera apparatus comprising, in combination: a housing, a prime lens assembly removably mounted on said housing and having an optical axis, a movable device having a mirror and a partial mirror mounted thereon and positioned in substantially the same plane at an angle to said optical axis, means for moving said device in a direction at right angles to said optical axis to bring either of said mirrors into alignment with said optical axis, a viewfinder eyepiece assembly pivotally mounted on said housing to turn about a horizontal axis, said assembly having elements positioned to receive light from either said mirror or said partial mirror, a fixed mirror in said housing positioned at an angle to said optical axis, and a movable turret having a plurality of lenses each movable into alignment with said optical axis to transmit light to said fixed mirror when said partial mirror is aligned with said optical axis.

5. Motion picture camera apparatus comprising, in combination: a housing, a prime lens assembly removably mounted on said housing and having an optical axis, a movable device having a mirror and a partial mirror mounted thereon and positioned in substantially the same plane at an angle to said optical axis, means for moving said device in a direction at right angles to said optical axis to bring either of said mirrors into alignment with said optical axis, a viewfinder eyepiece assembly pivotally mounted on said housing to turn about a horizontal axis, said assembly having elements positioned to receive light from either said mirror or said partial mirror, a fixed mirror in said housing positioned at right angles to said optical axis, a movable turret having a plurality of lenses each movable into alignment with said optical axis to transmit light to said fixed mirror when said partial mirror is aligned with said optical axis, a motion picture camera, and a relay lens optically interposed between said fixed mirror and said motion picture camera.

6. Motion picture camera apparatus comprising, in combination: a housing, a prime lens assembly removably mounted on said housing and having an optical axis, a movable device having a mirror and a partial mirror mounted thereon and positioned in substantially the same plane at an angle to said optical axis, means for moving said device in a direction at right angles to said optical axis to bring either of said mirrors into alignment with said optical axis, a viewfinder eyepiece assembly pivotally mounted on said housing to turn about a horizontal axis, said assembly having elements positioned to receive light from either said mirror or said partial mirror, a fixed mirror in said housing positioned at an angle to said optical axis, a movable turret having a plurality of lenses each movable into alignment with said optical axis to transmit light to said fixed mirror when said partial mirror is aligned with said optical axis, and a motion picture camera positioned to receive light from said fixed mirror.

7. A motion picture camera device comprising, in combination: a housing, a prime 35 mm lens assembly mounted on said housing, a viewfinder eyepiece assembly pivotally mounted on said housing to turn about a horizontal axis, a 16 mm motion picture camera, means for transmitting light from the prime lens assembly to either the motion picture camera or to the viewfinder eyepiece assembly, or both, the light path to the motion picture camera including spaced parallel fixed mirrors, the first being positioned at an angle to the axis of the prime lens assembly, to receive light therefrom, the second reflecting light from the first, and a relay lens positioned in the light path between said mirrors.

* * * * *